United States Patent [19]
Axer

[11] Patent Number: 5,268,833
[45] Date of Patent: Dec. 7, 1993

[54] RECTIFIER CIRCUIT INCLUDING FETS OF THE SAME CONDUCTIVITY TYPE

[75] Inventor: Klaus Axer, Lübeck, Fed. Rep. of Germany

[73] Assignee: U.S. Philips Corporation, New York, N.Y.

[21] Appl. No.: 895,761

[22] Filed: Jun. 9, 1992

Related U.S. Application Data

[63] Continuation-in-part of Ser. No. 872,568, Apr. 23, 1992.

[30] Foreign Application Priority Data

May 14, 1991 [DE] Fed. Rep. of Germany ....... 4115677

[51] Int. Cl.[5] .......................................... H02M 7/219
[52] U.S. Cl. ..................................... 363/127; 323/351
[58] Field of Search ................ 323/282, 351; 363/127, 363/147; 307/127

[56] References Cited

U.S. PATENT DOCUMENTS

| | | | |
|---|---|---|---|
| 4,533,988 | 8/1985 | Daly et al. | 363/127 |
| 4,649,302 | 3/1987 | Damiano et al. | 307/584 |

FOREIGN PATENT DOCUMENTS

| | | |
|---|---|---|
| 112119 | 6/1984 | European Pat. Off. |
| 3400973 | 7/1985 | Fed. Rep. of Germany |
| 63-64572 | 3/1988 | Japan |

*Primary Examiner*—William H. Beha, Jr.
*Attorney, Agent, or Firm*—Bernard Franzblau

[57] ABSTRACT

A rectifier circuit is constructed entirely with field-effect transistors of the same conductivity type and which provides rectification with a small voltage drop and hence a high efficiency. A normally-off FET is coupled between an alternating voltage input and a direct voltage output. A bias circuit biases the gate of this FET so as to reduce the effective threshold voltage of the FET substantially to zero. Bridge rectifier circuits, based on this principle make it possible to obtain both half-wave and full-wave rectification with a very small voltage drop. Various circuits for generating the gate bias are disclosed.

24 Claims, 3 Drawing Sheets

RECTIFIER CIRCUIT INCLUDING FETS OF THE SAME CONDUCTIVITY TYPE

This is a continuation-in-part of application Ser. No. 872,568, filed Apr. 23, 1992.

BACKGROUND OF THE INVENTION

This invention relates to a rectifier circuit for deriving a direct voltage from a periodically varying input voltage, particularly an alternating voltage, to be applied to two input terminals, the circuit comprising a first normally-off field-effect transistor (FET) having its main current path arranged between one of the input terminals and a first output terminal constituting one pole of the direct voltage.

If the gate of the first FET in such a circuit is connected directly to the main current path terminal which connected to the input terminal the transistor will operate as a diode, for example, to convert a symmetrical alternating voltage into a pulsating direct voltage, which can be smoothed by simple means such as a capacitor, or to convert a pulsating direct voltage into a smoothed direct voltage. When an N-channel FET is used, this transistor is turned on when the gate is more positive than one of the main current path terminals, i.e. the output terminal in the present circuit, by an amount at least equal to the threshold voltage of the transistor. However, this produces a voltage drop of the magnitude of the threshold voltage across the transistor. Although this threshold voltage can be influenced by the fabrication process, it cannot be made arbitrarily small.

SUMMARY OF THE INVENTION

It is an object of the invention to provide a rectifier circuit which comprises at least one FET and exhibits a small voltage drop.

According to the invention this object is achieved in that the gate of the first FET is connected to a bias circuit for generating a substantially constant bias voltage between the gate and the input terminal connected to the first FET, the bias voltage reducing the effective threshold voltage of the first FET.

By producing on the gate of the FET a bias voltage substantially equal to the threshold voltage it is possible to obtain a rectifying element which has a very small voltage drop in the on state. For this purpose it is not even necessary to fabricate a FET with a very low threshold voltage, because, in general, it is easy to generate a bias voltage which also compensates for a higher threshold voltage.

In its basic form the rectifier circuit in accordance with the invention is a half-wave rectifier for, for example, symmetrical alternating voltages. However, for many uses, for example for converting an alternating voltage into a direct voltage for the power supply of electronic circuits, a full-wave rectifier, particularly in the form of a bridge circuit, is required. A rectifier bridge circuit comprising only field-effect transistors is known from DE-OS 3,400,973 and comprises four normally-off field-effect transistors which are arranged in two branches via which each pole of the alternating voltage is connected to a respective one of the two poles of the direct voltage, the gate of each transistor in the first branch being connected to the respective other pole of the alternating voltage. The transistors in one branch are of a conductivity type opposite to that of the transistors in the other branch. As a result, the gate of each transistor in each branch can be connected to the respective other pole of the alternating voltage so that the alternating voltage can be converted into a pulsating direct voltage substantially without a voltage drop. However, when this pulsating direct voltage is to be smoothed by means of a capacitor the latter must be preceded by a rectifying device, for example a further diode-connected field-effect transistor. Moreover, it is more intricate to fabricate field-effect transistors of different conductivity types in a single semiconductor body than field-effect transistors of the same conductivity type.

The rectifier circuit in accordance with the invention enables a bridge rectifier circuit with a small voltage drop to be constructed by means of field-effect transistors of only one conductivity type. A suitable modification of the rectifier circuit in accordance with the invention for a bridge rectifier circuit whose input voltage is a substantially symmetrical alternating voltage is characterised in that for each input terminal there is provided a first normally off FET with a separate bias circuit and a common first output terminal, each input terminal being further connected to a second output terminal via a second normally off FET of the same conductivity type, which second output terminal constitutes the second pole of the direct voltage, and the gate of each second FET being connected to the respective other input terminal.

Thus, in the branch feeding the second output terminal the FETs are arranged in a manner as is known from the afore-mentioned DE-OS 3,400,973, so that no significant voltage drop is produced across this branch. The branch feeding the first output terminal now comprises two times the rectifier circuit in accordance with the invention with the bias circuit, the voltage drop produced in this branch being also small. Moreover, a capacitor may be connected directly to the output terminals in order to obtain a smoothed direct voltage, without an additional rectifying device being required.

A further embodiment of the invention, in which the bias circuit is of very simple construction, is characterised in that each bias circuit comprises a first capacitance arranged between the gate of the first FET and the associated input terminal, and a first rectifying device which at least for a fraction of the period of the input voltage couples the gate of the first FET to means for supplying an auxiliary voltage. Since the currents through the gate are very small the first capacitance can be of small value. The use of the first rectifying device enables the auxiliary voltage to be referred to an arbitrary point of the entire arrangement because this voltage should merely be sufficiently higher than the threshold voltage of the first FET for only a fraction of the period of the input voltage, enabling a small loss of the charge on the first capacitance to be compensated for via the first rectifying device. In the case of the bridge circuit it is generally advantageous to generate a separate auxiliary voltage for each bias circuit.

In the simplest case the first rectifying device can be a diode but if all the elements of the rectifier circuit are integrated in a single semiconductor body, this diode cannot readily be formed in the same fabrication process as the field-effect transistors. Therefore, it is advantageous if, in a further embodiment of the invention, the first rectifying device is a first additional normally-off FET the same conductivity type as the first FET, and the gate of the first additional normally-off FET is connected to the one terminal of its main current path. This enables all the FETs to be fabricated in the same manner.

If it assumed that the auxiliary voltage is supplied by means constituting a high-impedance source and this auxiliary voltage is substantially higher than the threshold voltage of the FETs in the two branches, the gates of the FETs in the second branch may be biased in such a manner via the first rectifying device that these transistors still conduct at the zero crossing of the alternating voltage, so that a reverse current can flow from the relevant pole of the direct voltage to the alternating voltage. In order to preclude this effectively it is advantageous, in a further embodiment of the invention, to arrange a voltage-limiting element in parallel with the first capacitance. This element may be, for example, a customary zener diode. A simpler solution, however, is achieved in a further embodiment of the invention in which the voltage-limiting element is a second additional normally-off FET of the same conductivity type as the first FET, which second additional normally-off FET has its gate connected to the one terminal of its main current path and has a threshold voltage substantially equal to the threshold voltage of the first FET. When all the FETs are manufactured simultaneously in a siggle fabrication process, they automatically have substantially the same threshold voltage so that the gate of the first FET is automatically biased in such a manner that the current flow through these FETs is terminated exactly at the instant when the instantaneous value of the alternating voltage becomes smaller than direct voltage. As a result a direct voltage can be generated which is smoothed by means of a capacitor and whose value is substantially equal to the maximum amplitude of the alternating voltage. This yields a rectifier circuit which exhibits an extremely small voltage drop and which, in particular, can be smaller than a rectifier circuit comprising a customary diode.

The means for supplying the auxiliary voltage can be constructed in various ways. In a further embodiment of the invention, in which the input voltage is a substantially symmetrical alternating voltage, the means for supplying an auxiliary voltage are constituted by the other input terminal. The first rectifying device is then connected to the other input terminal via a high resistance provided that the first rectifying device itself does not have a very high impedance, which is readily possible when it is realised by means of a FET.

Another way of constructing the means for supplying the auxiliary voltage is provided by another embodiment of the invention, in which the means for supplying an auxiliary voltage in each bias circuit comprise a second capacitance, which is connected to the second output terminal, and a second rectifying device, which is connected to the same input terminal as the associated first FET. This embodiment is advantageous if the input voltage is a unipolar pulsating voltage, the rectifier circuit in accordance with the invention being used for half-wave rectification and the second output terminal being connected directly to the other input terminal. However, this embodiment can also be used if the input voltage is a symmetrical input voltage and the rectifier circuit is constructed as a bridge circuit. Suitably, the second capacitance is substantially smaller than the first capacitance so that the first capacitance is recharged only slightly in each period of the input voltage. In a further embodiment of the invention the second rectifying device is a third additional normally-off FET which is of the same conductivity type as the first FET and has its gate connected to the one terminal of its main current path. This enables all the elements of the rectifier circuit to be readily integrated in a semiconductor body.

A further possibility of adapting the means for supplying the auxiliary voltage to a bridge rectifier circuit for an input voltage which is a substantially symmetrical alternating voltage is provided by a further embodiment of the invention, which is characterised in that the means for supplying an auxiliary voltage in each bias circuit comprise a second capacitance, which is connected to the respective other input terminal, and a second rectifying device, which is connected to the second output terminal.

In particular, when used for integrated semiconductor circuits with inductive power supply, it is a common practice to integrate this rectifier circuit together with all the associated FETs in a common semiconductor. In such a case it is advantageous that the second rectifying device be formed by the junction between the main current path of the further FET and the semiconductor body connected to the one pole of the direct voltage. Thus, no separate space is required for the second rectifying device.

BRIEF DESCRIPTION OF THE DRAWING

Embodiments of the invention will be described in more detail hereinafter with reference to the accompanying drawings. In the drawings.

DESCRIPTION OF THE PREFERRED EMBODIMENTS

Figure 1:
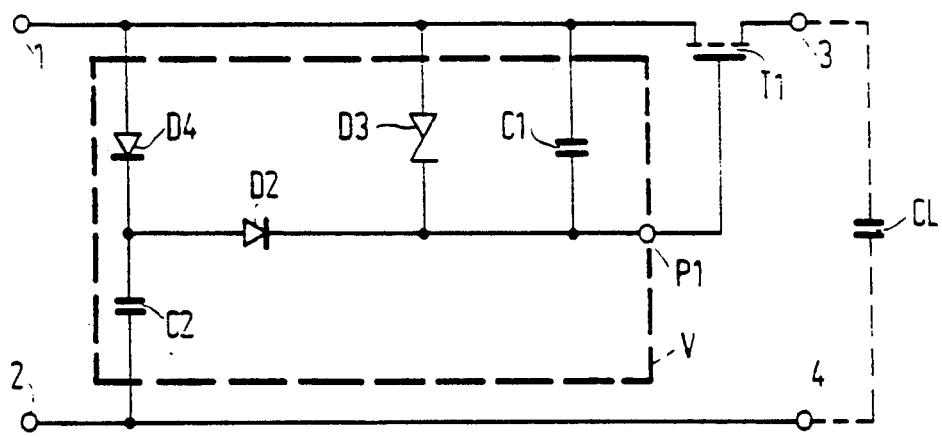
FIG. 1 shows a first embodiment of the rectifier circuit in accordance with the invention.

FIG. 1 shows a rectifier circuit in which an input terminal 1 is connected to an output terminal 3 via the main current path of a normally-off field-effect transistor (FET) T1. The other input terminal 2 is connected directly to the second output terminal 4. The gate of the FET T1 is connected to a point P1 of a bias circuit V, from which the gate receives a bias voltage to reduce the threshold voltage of the transistor T1.

For explanation purposes this bias voltage on point P1 is assumed to be zero, i.e. the point P1 carries the same voltage as the input terminal 1. If it is further assumed that T1 is an N-channel FET this means that no current will flow in this transistor until the input voltage on the input 1 has become more positive than the output terminal 3 by an amount equal to the threshold voltage of the FET T1. This applies both to the case in which the output terminals 3 and 4 are interconnected by a load resistor and the case in which a smoothing capacitor CL is arranged between the output terminals 3 and 4 in order to obtain a smoothed direct voltage. In the last-mentioned case a direct voltage is obtained between the output terminals 3 and 4, i.e. across the smoothing capacitor CL, which is smaller than the maximum positive amplitude of the input voltage between the input terminals 1 and 2 by an amount equal to the threshold voltage to the FET T1. This applies both in the case where the input voltage is a unipolar pulsating voltage, the rectifier circuit shown then being, for example, a part of a voltage multiplier circuit, and in the case where the input voltage is a symmetrical alternating voltage, the rectifier circuit shown then being a half-wave rectifier.

For an optimum utilisation of the input voltage, i.e. to transfer it to the output terminal 3 with a minimal voltage drop, there is provided a bias circuit V which generates at the point P a bias voltage for the gate of the FET relative to the input terminal 1 and the main current path terminal of the FET T1 connected thereto. When this bias voltage is substantially equal to the threshold voltage of the FET T1 then a current flows this FET T1 when the voltage on the input terminal 1 is only slightly higher than the voltage on the output terminal 3 because the voltage on the point P1, which tracks the voltage on the input terminal 1, already exceeds the voltage on the output terminal 3 by the threshold voltage. This results in a rectifier circuit with a very small voltage drop.

For generating the bias voltage the bias circuit V comprises a capacitance C1 arranged between the point P1, i.e. the gate of the FET T1, and the input terminal 1. Since the leakage current via a gate is extremely small the loss of charge of the capacitance C1 is only small so that a substantially constant bias voltage is obtained at the point P1.

A loss of charge can be compensated for in that the capacitance C1 is recharged every period of the input voltage. As a result, the value of the capacitance C1 can be small, for example, C1 = 10 pF being adequate for an input frequency of 100 kHz. However, as the loss of charge of the capacitance C1 cannot be predicted unambiguously, for example because leakage currents are also temperature dependent, the bias voltage may become higher than the threshold voltage as a result of excessive recharging of the capacitance C1. However, this should absolutely be avoided because in that case the FET T1 would still be conductive when the voltage on the input terminal 1 is lower than the voltage on the output terminal 3, resulting in a current flow from the output terminal 3 to the input terminal 1 through the FET T1, which would for example discharge a smoothing capacitor CL. For this reason a voltage-limiting element, in the present case a zener diode D3, is connected parallel to the capacitance C1 so as to limit the bias voltage to a value below the threshold voltage of the FET T1.

The capacitance C1 is refreshed by an auxiliary voltage via a rectifying device, here represented as a diode D2, which auxiliary voltage is generated by a diode D4 connected to the input terminal 1 and a capacitance C2 connected to the other input terminal 2. When the input voltage on the input terminal 1 is positive relative to the input terminal 2 the capacitance C2 is charged via the diode D4, the diode D2 remaining cut off when it is assumed that point P1 already carries a positive bias voltage. If subsequently the input voltage between the input terminals 1 and 2 decreases or there is even a change of sign, the voltage on the point P1 also becomes smaller relative to the input terminal 1 owing to the capacitor C1, so that now charge can be transferred from the capacitance C2 to the capacitance C1 via the diode D2. As this requires only a small charge the capacitance C2 suitably has a very small value, for example, approximately two orders of magnitude smaller than the value of the capacitance C1. As a result of this, only a very small charge has to be drained via the zener diode D3.

Figure 2:
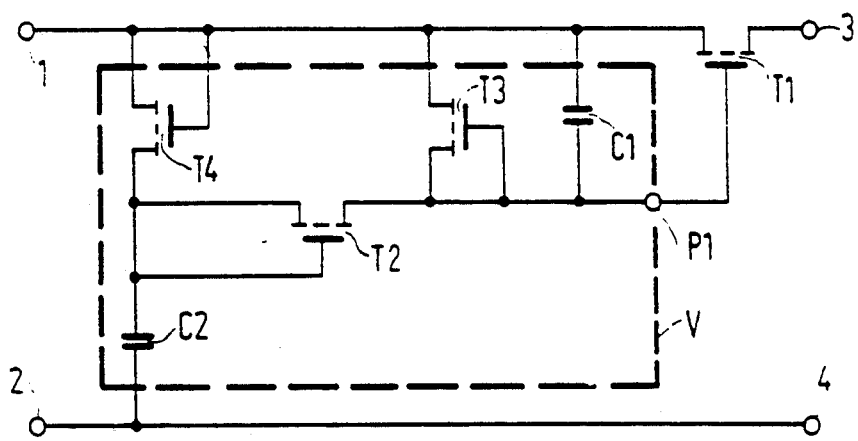
FIG. 2 shows the circuit of FIG. 1 implemented exclusively by means of FETs of the same conductivity type.

If the circuit shown in FIG. 1 forms part of an integrated circuit integrated on a single semiconductor body, the fabrication of field-effect transistors, normal diodes and even zener diodes by means of the same process is difficult so that generally additional process steps are necessary. A rectifier circuit which has the basic construction as shown in FIG. 1 but which is easier to integrate is shown in FIG. 2. The diode D2 of FIG. 1 is now formed by a normally-off FET T2 having its gate and a main current path terminal connected to the capacitance C2. Likewise, the diode D4 of FIG. 1 is now constituted by a FET T4 having its gate and a main current path terminal connected to the input terminal 1. By means of this FET T4 the capacitance C2 is charged to a voltage equal to the maximum input voltage minus the threshold voltage of the FET T4. If subsequently the input voltage decreases the capacitance C2 discharges into the capacitance C1 via the FET T2 when the voltage on the point P1 is equal to the maximum voltage across the capacitance C2 minus the threshold voltage of the FET T2. However, since the bias voltage on the point P1 should exceed the voltage on the input terminal 1 by approximately the threshold voltage of the FET T1 and the threshold voltages of the FETs are substantially equal owing to the fabrication by the same process, the maximum amplitude of the input voltage between the input terminals 1 and 2 should be at least three times the threshold voltage of the FETs in order to obtain an adequate bias voltage on the point P1. However, for most of the customary input voltages this can be achieved by a suitable adjustment of the threshold voltages during the fabrication process.

As the threshold voltages of all the FETs are substantially equal when manufactured in the same process, the zener diode D3 in FIG. 1 can also be formed very simply by the FET T3 in FIG. 2, whose main current path is connected in parallel with the capacitance C1 and whose gate is connected to the point P1, because this FET T3 is turned on at the very instant at which the voltage across the capacitance C1 exceeds the threshold voltage of the FET T3. As the threshold voltage of the FET T1 has substantially the same value the bias voltage on the point P1 is automatically limited to this value.

Figure 3:
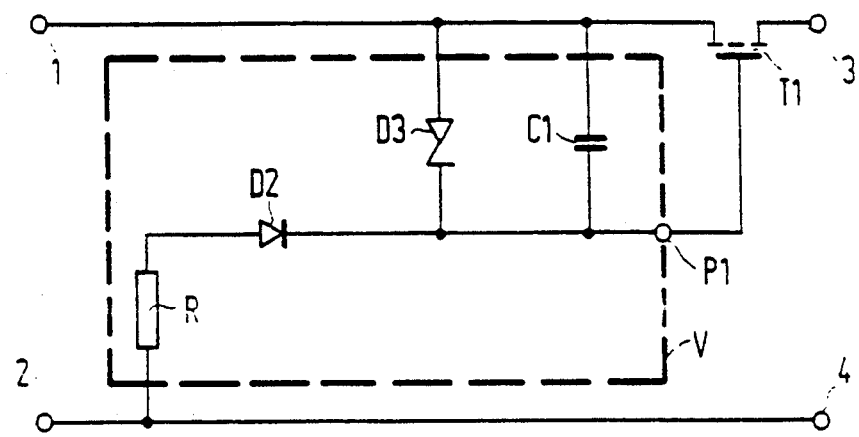
FIG. 3 shows a further embodiment of the rectifier circuit in accordance with the invention.

FIG. 3 shows a rectifier circuit which is of even simpler construction than the circuit shown in FIG. 1 but whose input voltage is assumed to be a symmetrical alternating voltage. In addition to the capacitance C1, the zener diode D3 and the diode D2 the bias circuit V comprises a resistor R of high value arranged in series with the diode D2 and connected to the input terminal 2. During the part of the period of the input voltage in which the input terminal 1 is negative relative to the input terminal 2, the capacitance C1 is then charged via the resistor R and the diode D2 until the zener diode D3 is turned on. This results in a positive bias voltage on the point P1 for the gate of the FET T1. If the diode D2 is constructed as a FET as explained with reference to FIG. 2, this FET can be dimensioned to have such a high impedance that a separate resistor R can be dispensed with. In the circuit shown in FIG. 3 the input terminal 2 thus directly supplies the auxiliary voltage for recharging the capacitance C1.

Figure 4:
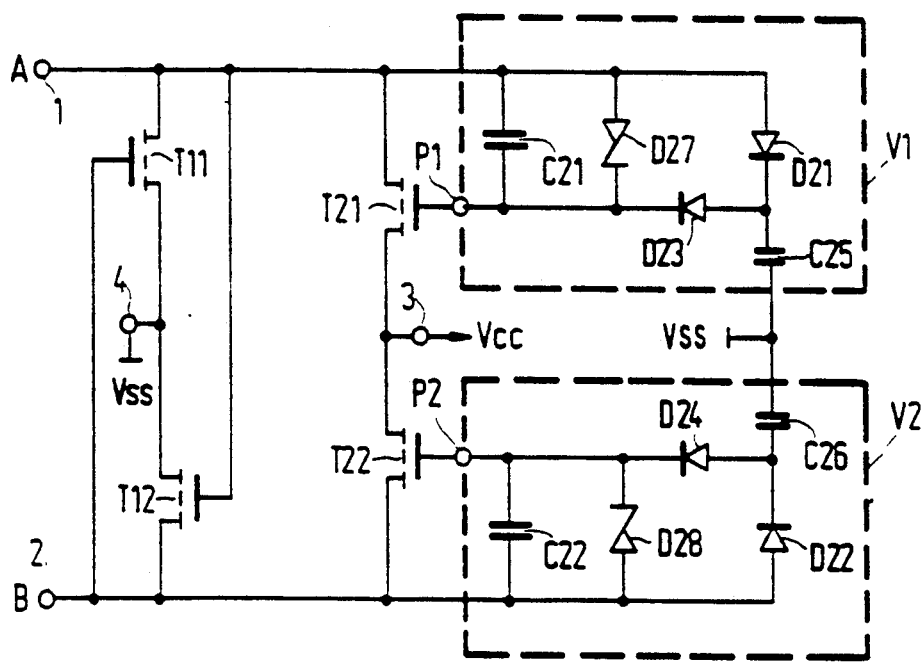
FIG. 4 shows an embodiment of the rectifier circuit in accordance with the invention constructed as a bridge rectifier circuit.

FIG. 4 shows a bridge rectifier circuit which converts a symmetrical alternating voltage into a direct voltage with a minimal voltage drop, which direct voltage can also be converted into a smoothed direct voltage by means of a smoothing capacitor. The bridge rectifier circuit shown in FIG. 4 comprises two branches comprising the transistors T11, T12 and T21, T22. These transistors are normally-off field-effect transistors of the same conductivity type. In the first branch the transistor T11 connects the input terminal 1 for the pole A of an alternating voltage to the output terminal 4 of the direct voltage $V_{ss}$ to be generated, and the transistor T12 connects the input terminal 2 for the other pole B of the alternating voltage to the output terminal 4. The gates of the transistors T11 and T12 are connected to the respective other input terminal 2 and 1, respectively. Assuming that n-type field-effect transistors are employed, the transistor T12 is turned on in response to the halfwave of the alternating voltage for which the pole A is positive with respect to the pole B, and the input terminal 2 is connected to the output terminal. Likewise, the transistor T11 is turned on in response to the other halfwave. In both cases a voltage drop occurs only between the relevant input terminal and the output terminal 4, which voltage drop depends on the internal resistance of the transistors and on the load current of the load connected to the direct voltage thus generated.

In the second branch the transistor T21 connects the input terminal 1 for the pole A of the alternating voltage and the transistor T22 connects the input terminal 2 for the pole B of the alternating voltage to the output terminal 3 for the pole $V_{cc}$ of the direct voltage. The gate of the transistor T21 is connected to a point P1 which carries a positive bias voltage supplied by the bias circuit V1. Similarly, the gate of the transistor T22 is connected to a point P2 which carries a positive bias voltage supplied by the bias circuit V2. The bias voltage on points P1 and P2 is again approximately equal to the threshold voltage of the transistors T21 and T22 respectively so that these transistors conduct alternately for the two halfwaves of the input voltage and connect the input terminal 1 or 2 to the output terminal 3 with a very small voltage drop.

The bias circuits V1 and V2 are similar to one another and to the bias circuit V in the rectifier circuit shown in FIG. 1. The capacitance C1 in FIG. 1 corresponds to the respective capacitances C21 and C22 in FIG. 4, the zener diode D3 corresponds to the respective zener diodes D27 and D28 in FIG. 4, the diode D2 in FIG. 1 corresponds to the respective diodes D23 and D24 in FIG. 4, the diode D4 in FIG. 1 corresponds to the respective diodes D21 and D22 in FIG. 4, and the capacitance C2 in FIG. 1 corresponds to the respective capacitances C25 and C26 in FIG. 4. The terminals of the last-mentioned capacitances which are remote from the diodes are not connected directly to the respective other input terminal but, via the pole $V_{ss}$ of the direct voltage, to the output terminal 4, which is connected to the relevant input terminal via the respective transistor T11 or T12 when the capacitance C25 or C26 is charged and discharged respectively.

It is evident that the diodes D21 to D24 and the zener diodes D27 and D28 can be constructed as normally off field-effect transistors in the same way as described with reference to FIG. 2.

Figure 5:
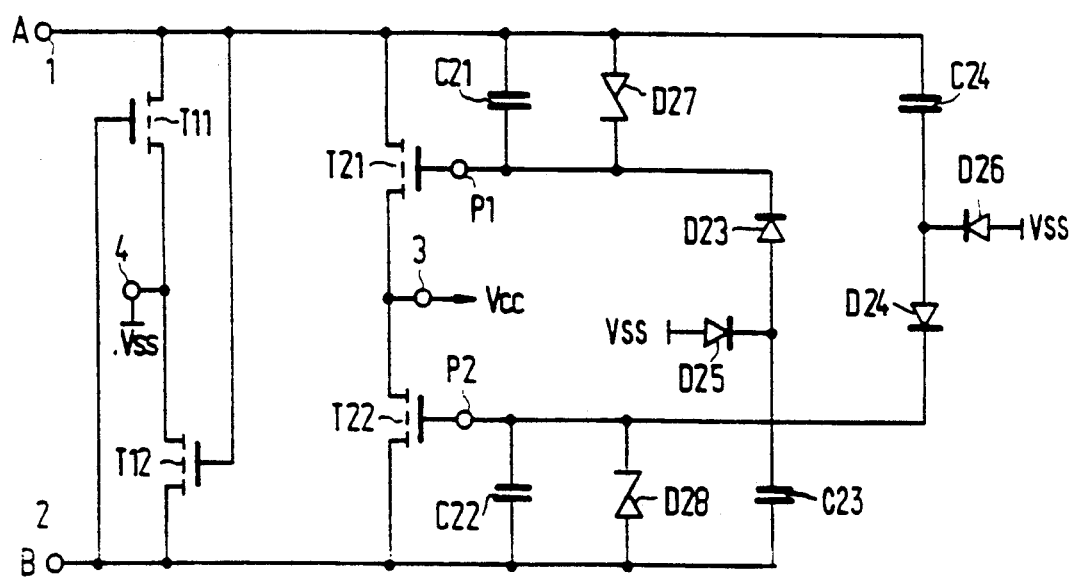
FIG. 5 shows another embodiment constructed as a bridge rectifier circuit.

FIG. 5 shows another embodiment of a bridge rectifier circuit in which the auxiliary voltage for recharging the capacitances C21 and C22 is generated in a slightly different manner. Elements having the same function bear the same reference numerals. The first branch, comprising the transistors T11 and T12, is the same as shown in FIG. 4. In the second branch the gates of the transistors T21 and T22 are again connected to the points P1 and P2 which carry a positive voltage when the previously-mentioned conductivity type is used.

The point P1 will be considered first, which point is connected to the input terminal 1 via a capacitance C21. Furthermore, the point P1 is connected to the other input terminal 2 via the series arrangement of a diode D23 and a further capacitance C23. The node between these two elements is connected to the pole $V_{ss}$ of the direct voltage via a diode D25. The capacitance C23 is again substantially smaller than the capacitance C21.

During each halfwave for which the pole B of the alternating input voltage is more positive than the pole A, charge is transferred from the capacitance C23, via the diode D23, to the capacitance C21, whereas at the end of such a halfwave, or at the beginning of the other halfwave, this charge is returned to the capacitance C23 via the diode D25. The capacitance C21 is thus charged to a positive voltage relative to the input terminal 1 in the course of a plurality of halfwaves. As a result, the transistor T21 is already turned on before the voltage at the input terminal 1 exceeds the voltage $V_{cc}$ on the output terminal 4 by an amount equal to the threshold voltage of the transistor T21.

However, again it must be prevented that the voltage of the point P1 becomes more positive than the voltage on the input terminal 1 by an amount exceeding the threshold voltage of the transistor T21, i.e. it must be prevented that the capacitance C21 is charged by more than this voltage. Therefore, a voltage-limiting element in the form of a zener diode D27 is connected parallel to the capacitance C21, the breakdown voltage of this zener diode being smaller than the threshold voltage of the transistor T21, albeit to a minimal extent. The difference between these two voltages then essentially determines the voltage drop between the alternating voltage, or its maximum amplitude, and the direct voltage.

The foregoing considerations also hold for the point P2, which is connected to the input terminal 2 via a capacitance C22 and a zener diode D28 and to the input terminal 1 via the series arrangement of the diode D24 and the capacitance C24. Again a diode D26 is arranged between the output terminal 4 and the node between said diode D24 and said capacitance C24 to provide a return path for the charging current of the capacitance C24.

Figure 6:
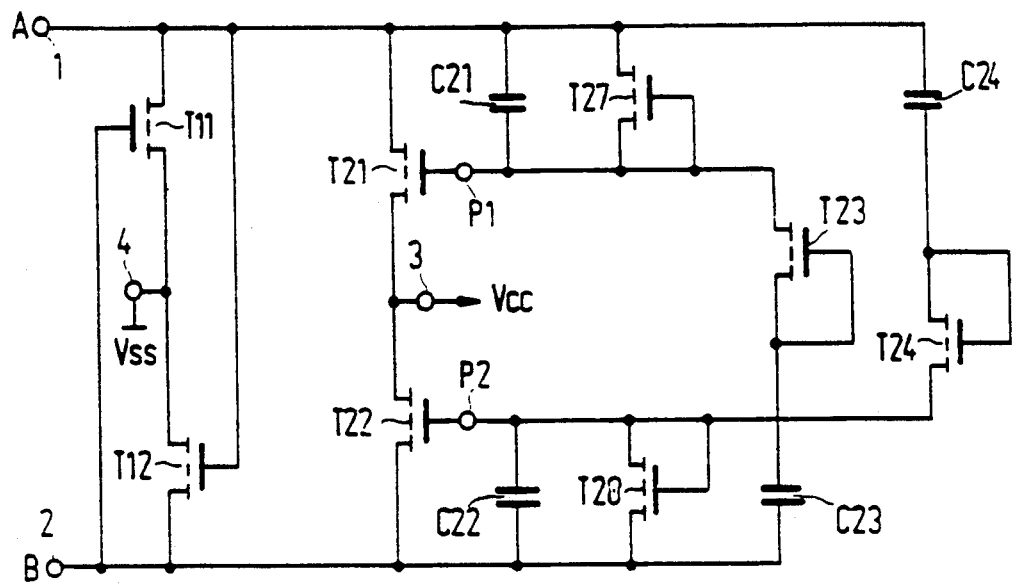
FIG. 6 shows the circuit in FIG. 5 implemented exclusively by means of FETs of the same conductivity type.
Figure 7:
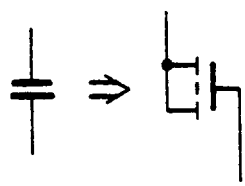
FIG. 7 shows a capacitance implemented by means of a FET.

FIG. 6 shows the circuit of FIG. 5 implemented by means of field-effect transistors only. The capacitances C21 to C24 shown therein as well as the circuits described above can be realised in known manner, as illustrated in FIG. 7, i.e. by means of the capacitance of the gate of a field-effect transistor relative to the main current path. The value of the capacitance can be determined by the surface area of the gate. In FIG. 6 the diode D23 of FIG. 5 is formed by a field-effect transistor T23 which, except for its geometrical dimensions, is constructed in the same way as the transistors T11, T12, T21 and T22 in the two branches of the rectifier bridge. The gate of the transistor T23 is connected to the one terminal of the main current path which is also connected to the capacitance C23. Assuming that initially the capacitance C23 has been fully discharged, a charging current will flow from the capacitance C23 into the capacitance C21 via the transistor T23 during the half-wave of the alternating voltage in which the input terminal 2 is more positive than the voltage on the point P1 by an amount larger than the threshold voltage of the transistor T23. The capacitance C23 is recharged in that the transistor T23 has an n-type main current path arranged in the p-type substrate of the semiconductor body, to which the output terminal 4 is also connected. This results in a diode corresponding to the diode D25 in FIG. 5 being formed between the output terminal 4 and the main current path and, consequently, the node between the transistor T23 and the capacitance C23.

In the circuit shown in FIG. 6 the zener diode D27 of FIG. 5 is formed by a field-effect transistor T27 having its main current path arranged in parallel with the capacitance C21 and having its gate connected to the point P1. The threshold voltage of the transistor T27 should at most be equal to the threshold voltage of the transistor T21 but, suitably, it should be slightly smaller. This is because of the fact that if the voltage on the point P1 becomes more positive than the threshold voltage of the transistor T27 as a result of the capacitance C21 being charged, the gate voltage of this transistor will also be more positive than the voltage on the main current path terminal connected to the input terminal 1 so that the transistor T27 is turned on and inhibits further charging of the capacitance C21. Thus, the transistor T21 is not turned on until the voltage on the input terminal 1 is slightly higher than the voltage on the output terminal 3 of the direct voltage.

The same holds for the point P2, which is connected to the input terminal 2 via a field-effect transistor T28, which corresponds to the transistor T27, and to the capacitance C24 via a transistor T24, which corresponds to the transistor T23. Since the circuit is thus constructed symmetrically for the two halfwaves of the alternating voltage, this yields rectification with a small voltage drop and hence with a high efficiency.

It is to be noted that in the circuit shown in FIG. 5 the capacitances C23 and C24 may each be replaced by a high resistance and the diodes D25 and D26 may be dispensed with so that at each side a circuit similar to that shown in FIG. 3 is obtained. Likewise, the capacitances C23 and C24 in FIG. 6 may be replaced by direct interconnections and the transistors T23 and T24 may have very high impedances.

I claim:

1. A rectifier circuit for deriving a direct voltage from a periodically varying input voltage to be applied to two input terminals, the circuit comprising: a first normally-off field-effect transistor (FET) having its main current path coupled between one of the input terminals and a first output terminal constituting one pole of the direct voltage, wherein the gate of the first FET is connected to a bias circuit for generating a substantially constant bias voltage between the gate and said one input terminal, the bias voltage being approximately equal to the threshold voltage of the first FET so as to reduce the effective threshold voltage of the first FET.

2. A rectifier circuit as claimed in claim 1, wherein the bias circuit comprises;

a capacitance and a voltage-limiting element connected in parallel between the gate of the first FET and a first one of said input terminals, and a resistor and a first rectifier element connected in series between a second one of the two input terminals and the gate of the first FET.

3. A rectifier circuit as claimed in claim 1, wherein the bias circuit comprises;

a first capacitance and a voltage-limiting element connected in parallel between the gate of the first FET and a first one of said input terminals, a first rectifier element and a second capacitance connected in series circuit to the input terminals, and a second rectifier element coupling a junction between the first rectifier element and the second capacitance to the gate of the first FET.

4. A rectifier circuit as claimed in claim 3, wherein said voltage-limiting element and said first and second rectifier elements each comprise a diode-connected FET of the same conductivity type as the first FET and wherein the voltage-limiting diode-connected FET has a threshold voltage at most equal to the threshold voltage of the first FET.

5. A rectifier circuit for a bridge rectifier arrangement for deriving a direct voltage from a substantially symmetrical alternating input voltage at first and second input terminals, comprising: a first normally off FET for each input terminal each with a separate bias circuit and a common first output terminal forming a first pole of the direct voltage, each bias circuit deriving a constant bias voltage of a value to compensate the threshold voltage of its respective first FET thereby to reduce the FET effective threshold voltage substantially to zero, each input terminal being further connected to a second output terminal via a respective second normally off FET of the same conductivity type, which second output terminal constitutes a second pole of the direct voltage, and the gate of each second FET being connected to the respective other input terminal.

6. A bridge rectifier circuit as claimed in claim 5 wherein the bias circuits comprise a first bias circuit coupled to the first input terminal and a gate of one first FET and a second bias circuit coupled to the second input terminal and a gate of another first FET, the first bias circuit including a first capacitance coupled between the first input terminal and the gate of the one first FET and the second bias circuit including a second capacitance coupled between the second input terminal and the gate of the another first FET, means coupling a first series arrangement of a first rectifier element and a third capacitance between the gate of the one first FET and the second input terminal and a second series arrangement of a second rectifier element and a fourth capacitance between the gate of the another first FET and the first input terminal, and third and fourth rectifier elements connecting respective junctions in the first and second series arrangements to the second output terminal.

7. A bridge rectifier circuit as claimed in claim 6, further comprising first and second voltage limiting elements coupled in parallel with the first and second capacitances, respectively, and wherein the third and fourth capacitances are smaller than the first and second capacitances.

8. A bridge rectifier circuit for deriving a direct voltage from a substantially symmetrical alternating input voltage at two input terminals, comprising: a first normally off field effect transistor (FET) coupled to each input terminal with a separate bias circuit and a common first output terminal forming a first pole of the direct voltage, each, each input terminal being further connected to a second output terminal via a respective second normally off FET of the same conductivity type, which second output terminal constitutes a second pole of the direct voltage, the gate of each second FET being connected to a respective other input terminal, wherein, each bias circuit comprises a first capacitance connected between the gate of its respective first FET and the associated input terminal, and a first rectifying device which, at least for a fraction of the period of the input voltage, couples the gate of a respective first FET to a means for supplying an auxiliary voltage.

9. A bridge rectifier circuit as claimed in claim 8 for a bridge rectifier circuit whose input voltage is a substantially symmetrical alternating voltage, characterized in that the means for supplying an auxiliary voltage in each bias circuit comprise a second capacitance connected to the respective other input terminal, and a second rectifying device connected to the second output terminal.

10. A bridge rectifier circuit as claimed in claim 8 wherein, the input voltage is a substantially symmetrical alternating voltage, and the means for supplying an auxiliary voltage comprise the other input terminal.

11. A bridge rectifier circuit as claimed in claim 8, wherein the means for supplying an auxiliary voltage in each bias circuit comprise a second capacitance t, connected to the second output terminal, and a second rectifying device t, connected to the same input terminal as its associated first FET (T21,T22).

12. A bridge rectifier circuit as claimed in claim 8, further comprising a voltage-limiting element t coupled in parallel with a respective first capacitance t.

13. A bridge rectifier circuit as claimed in claim 8, wherein each first rectifying device includes a first additional normally-off FET of the same conductivity type as the first FET, and with the gate of each first additional normally-off FET connected to one terminal of its main current path.

14. A bridge rectifier circuit as claimed in claim 13, wherein the means for supplying an auxiliary voltage in each bias circuit comprise a respective second capacitance, connected to the respective other input terminal, and a respective second rectifying device, connected to the second output terminal.

15. A bridge rectifier circuit as claimed in claim 14, in which all of the FETs are integrated in a common semiconductor body, and each respective the second rectifying device comprises a junction between the first additional FET and the semiconductor body, which is connected to the one pole ($V_{ss}$) of the direct voltage.

16. A bridge rectifier circuit as claimed in claim 12, wherein the voltage-limiting element comprises a second normally-off FET of the same conductivity type as the first FET and with its gate connected to one terminal of its main current path, and wherein the second FET has a threshold voltage substantially equal to the threshold voltage of the first FET.

17. A rectifier circuit for deriving a direct voltage from a periodically varying input voltage to be applied to two input terminals, the circuit comprising: a first normally-off field-effect transistor (FET) having its main current path coupled between one of the input terminals and a first output terminal constituting one pole of the direct voltage, wherein the gate of the first FET is connected to a bias circuit for generating a substantially constant bias voltage between the gate and said one input terminal, the bias voltage reducing the effective threshold voltage of the first FET, and wherein the bias circuit comprises a first capacitance connected between the gate of the first FET and said one input terminal, and a first rectifying device which, at least for a fraction of the period of the input voltage, couples the gate of the first FET to means for supplying an auxiliary voltage.

18. A rectifier circuit as claimed in claim 17, wherein the first rectifying device includes a first additional normally-off FET of the same conductivity type as the first FET and with the gate of the first additional normally-off FET connected to one terminal of its main current path.

19. A rectifier circuit as claimed in claim 17, further comprising a voltage-limiting element coupled in parallel with the first capacitance.

20. A rectifier circuit as claimed in claim 19, wherein the voltage-limiting element comprises a second normally-off FET of the same conductivity type as the first FET and with its gate connected to one terminal of its main current path, and wherein the second FET has a threshold voltage substantially equal to the threshold voltage of the first FET.

21. A rectifier circuit as claimed in claim 20, wherein the means for supplying an auxiliary voltage in the bias circuit comprise a second capacitance connected to a second output terminal, and a second rectifying device connected to said one input terminal.

22. A rectifier circuit as claimed in claim 20, wherein the input voltage is a substantially symmetrical alternating voltage, and the means for supplying an auxiliary voltage comprise the other input terminal.

23. A rectifier circuit as claimed in claim 17, wherein the means for supplying an auxiliary voltage in the bias circuit comprise a second capacitance connected to a second output terminal, and a second rectifying device connected to said one input terminal.

24. A rectifier circuit as claimed in claim 23, wherein the second rectifying device comprises a second normally-off FET of the same conductivity type as the first FET and with its gate connected to one terminal of its main current path.

* * * * *

UNITED STATES PATENT AND TRADEMARK OFFICE
CERTIFICATE OF CORRECTION

PATENT NO. : 5,268,833
DATED : Dec. 7, 1993
INVENTOR(S) : Klaus Axer

It is certified that error appears in the above-indentified patent and that said Letters Patent is hereby corrected as shown below:

ABSTRACT line 9, delete "," (comma).

Column 5, line 6, change "to" (second occurrence) to --of--.

IN THE CLAIMS

Claim 11, column 11, line 31, delete "t,";
line 33, delete "t,".

Claim 12, column 11, line 36, delete "t";
line 37, delete "t".

Claim 14, column 11, line 47, delete "," (first occurrence);
line 48, delete ",".

Claim 15, column 11, line 52, delete "the".

Signed and Sealed this

Fifth Day of July, 1994

Attest:

BRUCE LEHMAN

*Attesting Officer*    Commissioner of Patents and Trademarks